March 17, 1964 J. K. HAMPTON, JR 3,125,068
CAGING SYSTEM FOR SMALL LABORATORY ANIMALS
Filed Oct. 10, 1960 2 Sheets-Sheet 1
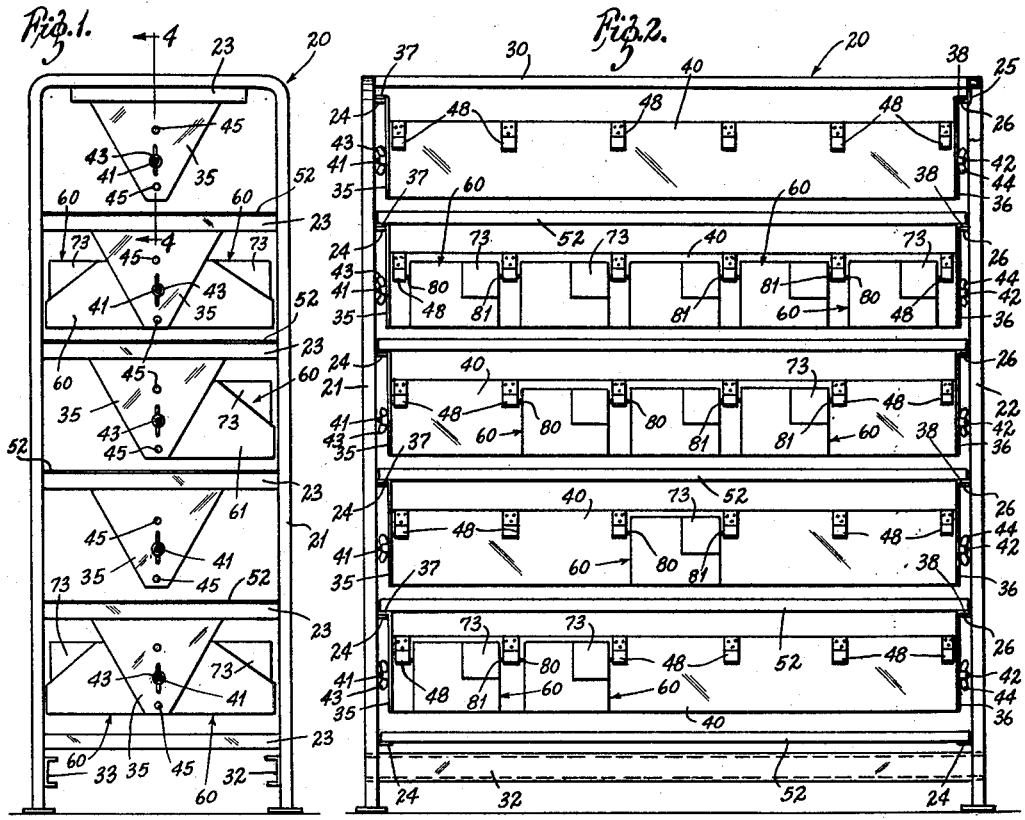
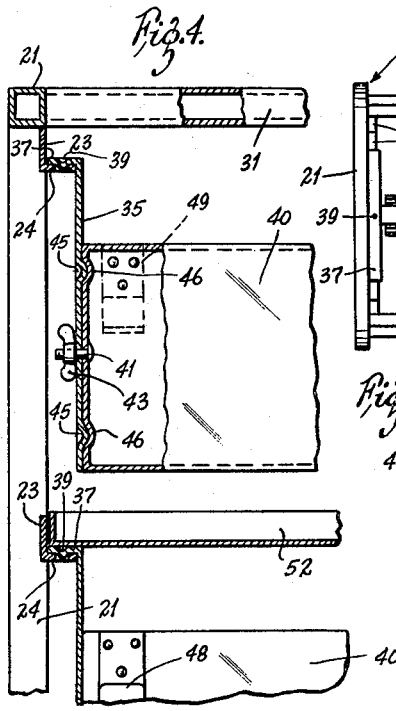
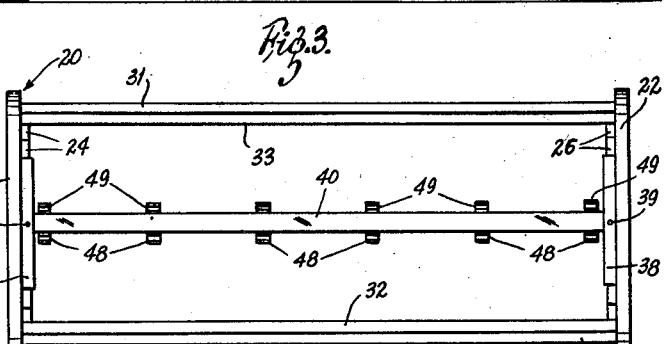
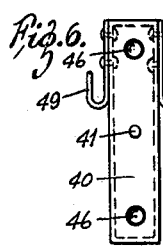
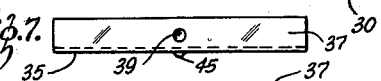
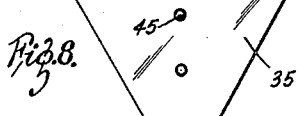
INVENTOR:
JOHN K. HAMPTON, JR.
BY Kingsland, Rogers & Ezell
ATTORNEYS

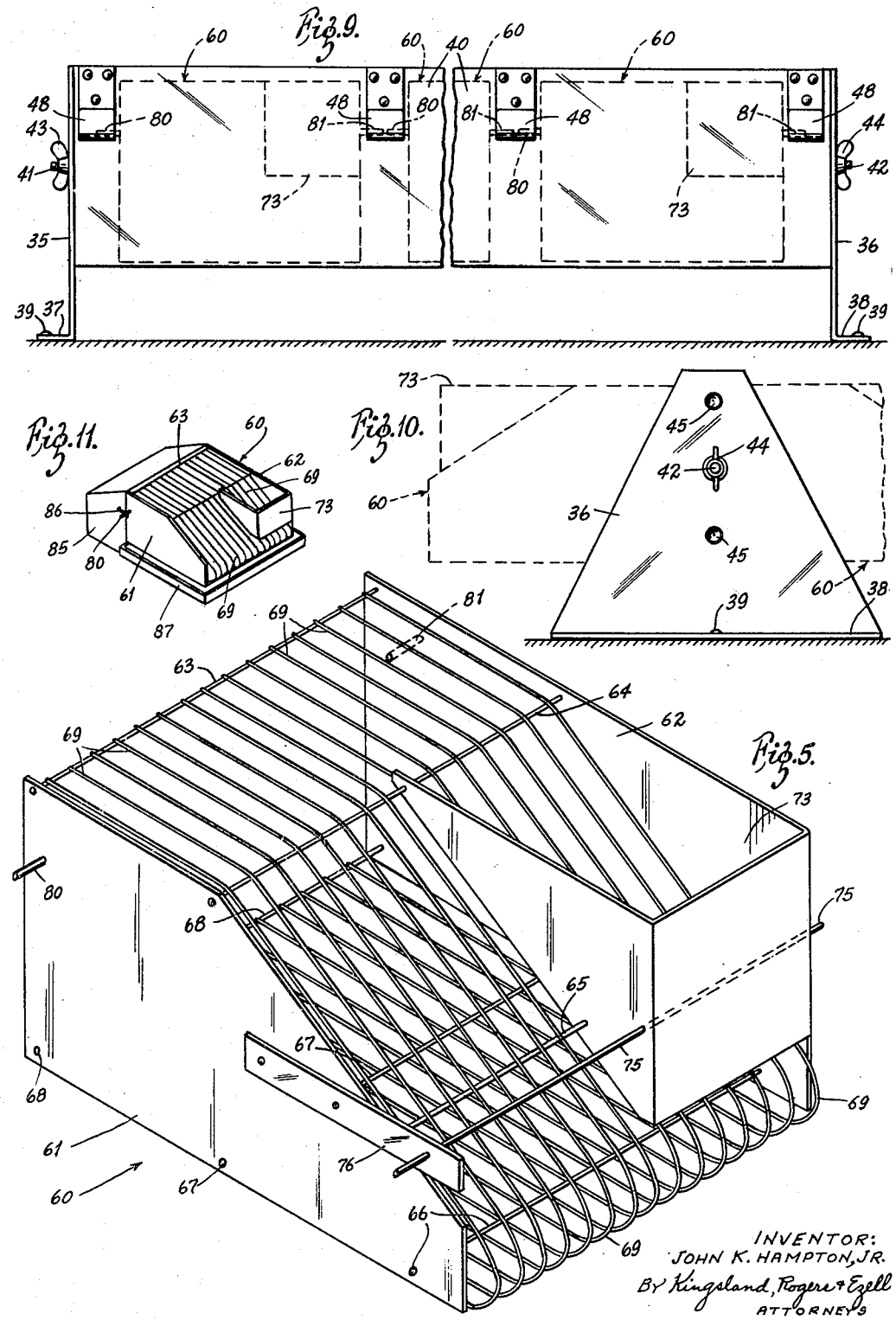

United States Patent Office 3,125,068
Patented Mar. 17, 1964

3,125,068
CAGING SYSTEM FOR SMALL LABORATORY
ANIMALS
John K. Hampton, Jr., New Orleans, La., assignor to Tower Investment Company, New Orleans, La., a partnership
Filed Oct. 10, 1960, Ser. No. 61,632
16 Claims. (Cl. 119—17)

The present invention relates to a caging system for small laboratory animals in particular, although features of the invention can be used for other types of cages.

The invention comprises a supporting frame, that may be portable and may be mounted on casters, with a plurality of superposed levels of cages. Each level has a removable frame containing a medial panel and means releasably to hook onto the panels a plurality of open-ended animal cages in such wise that the panel forms, a closure for the open ends thereof. Each cage is individually removable and is so designed that it can be turned around and hung onto the panel with its open end outwardly to give access to the interior thereof. Each panel assembly is removable from the frame and the panel assemblies are arranged to be used separately as a support resting upon a table or the like for supporting a complement of cages. Each individual cage has closed sides, an open top, front and bottom wall construction, the front wall being sloping and being provided with a food hopper and with a means to support a water container. An excreta tray is removably disposed beneath each layer of cages.

Among the objects of the invention is to provide a cage for small laboratory animals that requires no lid or hinged door or other moving parts to prevent escape of animals confined within it. Specifically it is an object to provide a cage with an open end that is automatically covered or closed by the means onto which the cage is suspended. A further object of the invention is to provide for supporting the same cage in an opposite position so that its open side is out and accessible to a user or to receive a door-type enclosure if that be desired. And an object is to produce a cage that can be used with accessories such as a breeder box.

A further object of the invention is to provide not only for the removal of individual cages from the support, but also for the provision of a separable rack frame for each level so that the frame can be removed both for cleaning of the equipment and for use outside of the main support. Additionally, it is an object of the invention to provide a frame for each level which includes suspending means at the end that can be removably attached to the main support and that can be rotated 180° whereby to constitute a stable means for holding the frame on some table or the like.

Other objects will appear from the description to follow.

In the drawings:

FIGURE 1 is an end elevation of the assembly with some of the individual cages removed;

FIGURE 2 is a front elevation of the assembly with some of the individual cages removed;

FIGURE 3 is a top view of the assembly with no cages in place;

FIGURE 4 is an enlarged partial section of the support and panel frame taken on the line 4—4 at the upper part of FIGURE 1;

FIGURE 5 is a perspective view of one of the individual cages;

FIGURE 6 is an end view of the panel upon which the individual cages are hung;

FIGURE 7 is a top view of one of the triangular end plates of the panel frame;

FIGURE 8 is an end view of the the end plate of FIGURE 7;

FIGURE 9 is a front elevation, broken away in the middle, of the panel frame with its end panels reversed to support it on a table;

FIGURE 10 is an end view of the arrangement of FIGURE 9; and

FIGURE 11 is an isometric view of a cage with a breeder box attached.

The principal support 20 comprises two U-shaped end supports 21 and 22 that can be formed of square tubing bent to shape. The member 21 has a plurality of cross members 23 formed of angle bars welded to the U-shaped member to provide a horizontal ledge 24 for purpose to be described. The member 22 has similar cross members 25 with ledges 26. The ledges are arranged in opposite, level, pairs. On both sides the top cross member 23 or 25 is welded to the top portion of its U-shaped member 21 or 22, while the remaining ones, here five in number, are disposed in super-posed relationship as indicated.

In addition to the cross bars on each individual end support 21 and 22, the end supports themselves are securely held in spaced relation to each other by a plurality of longitudinal connecting members. At the top, there are two longitudinal connecting members 30 and 31 that span between the U-shaped supports 21 and 22, their ends preferably being bolted to the respective U-shaped supports. At the bottom, there are two channel members 32 and 33 with their ends preferably bolted to the restrictive U-shaped support. The bolting of these cross members 30—30 enables the entire support to be dismantled. Thus, the foregoing components form a primary support having in the illustrated embodiment five different levels upon which to mount the cages hereafter to be described. The supports at each level may be identical so that one only needs to be described in full.

Each level supports a panel frame. Each panel frame extends from the U-shaped support 21 to the U-shaped support 22, being only slightly smaller than the distance between those supports so that it can be readily removed by passing between the end supports.

Each panel frame includes two end plates 35 and 36, here shown as triangular, and a vertical panel 40 between them, to be described hereafter. The end plates may be identical as outlined. Each has a top flange, the panel frame member 35 having a flange 37 and the triangular end member 36 having a flange 38. These flanges are turned outwardly so that they can be hung over the horizontal ledges 24 and 26 of the cross members 23 and 25 respectively. The arrangement prevents endwise movement of the end frames. Movement fore and aft of the end frames is prevented by a complementary dimple and hole arrangement 39 in the super-posed flanges and ledges as illustrated in FIGURE 4.

The two triangular plates 35 and 36 support between them the vertical panel 40. This panel is here illustrated as being hollow and of generally rectangular construction in order to have strength and rigidity for its intended use. The hollow arrangement also gives means for bringing utility devices such as water tubing, wires or the like, to each individual cage. The panel may be fabricated from sheet material. At its ends it was welded to it threaded studs 41 and 42 that pass through openings in the triangular plates 35 and 36. Wing nuts 43 and 44 outside the triangular plates secure the panel 40 to the plates. Radially outwardly from the studs 41 and 42 are indentations 45. Corresponding indentations 46 in the ends of the panel 40 cooperate with the indentations 45 to secure the panel 40 against rotation about the studs 41 and 42 except when the wing nuts 43 and 44 are loosened. The indentations are arranged so that the panel may be turned to 180°.

The panel has hanger means, here shown in the form of a plurality of hooks 48 and 49 on its opposite faces. In the illustration six hooks 48 are secured to the upper front face of the panel 40 and six corresponding hooks 49 are on the back face of the panel 40. These are arranged to support the individual cages.

There are a plurality of excreta trays 52 extending from the U-shaped support 21 to the U-shaped support 22. There is such a tray 52 under each panel frame, the trays being mounted between the angle bars 23 and 25 on top of the ledges 37 and 38 of the triangular plates 35 and 36. The trays may have indentations to inter-fit with the indentations 39 to prevent the trays from slipping out of place fore and aft of the main support.

There are a plurality of individual cages, each being generally indicated 60. As illustrated on a large scale in FIGURE 5, each cage comprises opposite, preferably solid, side panels 61 and 62 held in spaced relationship by a plurality of bars 63, 64, 65, 66, 67 and 68. These bars may pass through the panels 61 and 62, and be firmly secured.

A plurality of cross bars 69 can extend from a bar 63 around all of the cross bars previously mentioned to the cross bar 68. The bars 69 extend fore and aft of the individual cages and provide ample open work so that the cages can be cleaned and will remain sanitary. It will be noted that the back wall of the individual cage 60 is open.

The sloping front wall receives a food hopper 73, formed by extending the metal of the sides as indicated. There is also a rod 75 supported through the walls of the hopper 73 and a strip 76 that may be riveted or welded to the wall 61 and which extends out in line with the rod 75 to give it firm support at its free end. The rod extends beyond the wall 62 and beyond the strip 76 for a purpose to be described.

There are hanger rods 80 and 81 on the back part of each cage. These hangers are of a size and position to engage in the hooks 48 and 49 as will appear.

In FIGURE 11 a breeder box is shown attached to a cage 60. The box 85 has hooks 86 engageable with the rods 80—81 to hold it onto the cage 60. As will appear, the combination can be suspended onto the panel frame by the front hanger rod 75. This figure also illustrates an individual excreta tray 87 hung onto the bottom of the cage 60.

*Use and Operation*

In its principal use the main support 20 will be loaded with its panel frames and its excreta trays as indicated in FIGURES 1 and 2. The flanges on the triangular plates 35 and 36 are disposed upwardly so that the panel frames are suspended from the cross angle bars 23 and 25.

The indivdual cages 60 are hung against each panel 40 by hooking the rods 80 and 81 in adjacent pairs of hanger hooks 48 or 49 as the case may be. The hooks are wide enough to permit them to support cages in adjacent relationship as indicated in FIGURE 2. The solid side walls 61 and 62 isolate animals in adjacent cages, and the excreta trays give vertical isolation. Food can be placed in the food hopper 73, and water can be hung from the water bottle resting against the bar 75. With the open bottom, the excreta from the animals is collected by the excreta trays immediately below each level of cages.

With the present arrangement, if the user wishes to have the animal in any individual cage immediately accessible, he may remove that cage, turn it around and hang the end of the rod 75 in the hooks 48 or 49, thereby suspending the cage with its open end outwardly. This gives ready access to the animal within that cage. Also with this open end out, the cage may be provided with the usual hinged closure or any other means desired to close the open end. However, the completely open end as illustrated is desirable because it gives immediate access to the animals by the expedient of removing the cage from its hangers, yet it firmly closes the open end by the fact that the flat vertical edges of the sides 61 and 62 prevent any rocking of the cages that might give freedom of the animal around the panel or the walls.

Thus, each of the cages 60 may be removed entirely from the support and panel frame individually. Each also may be hung with its open end out.

In addition to the foregoing, each panel frame may be withdrawn from the main support 20 and used separately. In this case, the wing nuts 43 and 45 are loosened, and the triangular plates 35 and 36 are turned around to dispose their flanges at the bottom. Then, they provide stable support for the panels 40 and the cages thereon. This is illustrated especially in FIGURES 9 and 10. By this arrangement, an individual panel frame with its complement of cages 60 may be set on a table or the like for treatment of a certain group of animals.

The arrangement described provides maximum cleanliness and sanitation for this type of equipment. The main support is open framework so that it can be readily cleaned and sterilized. The separate panel frames may be taken out of the main support very readily by being lifted out, and may be thoroughly cleaned. Each panel is tight so no dirt can get in or out of it. The cages are completely open and can be readily sterilized.

The arrangement provides cages that require no lids or hinged doors or other moving parts to prevent escape of the animals, owing to the fact that the back side of the cage is unenclosed but is covered or closed when the cages are hung on the panels. Also, the use of a center panel permits mounting cages on both sides of the support.

The main support can be disassembled by unbolting the cross members 30, 31, 32 and 33 from the U-shaped support members 21 and 22. This disassembly is desirable for storing and shipping the equipment.

It will be evident that the angles 23 and 25 could be duplicated on the outer sides of the frames 21 and 22, to enable additional supports and columns of frames to be assembled therewith.

The lack of fixed shelving permits addition of attachments beneath each cage, such as a metabolism funnel. The use of individual panel frames for each tier of cages permits the use of different sized cages at different levels. The separation of each tier by the trays prevents inter-contamination; and any contaminated cage or tier of cages may be separately removed.

Various changes and modifications may be made within the process of this invention as will be readily apparent to those skilled in the art. Such changes and modifications are within the scope and teaching of this invention as defined by the claims appended hereto.

What is claimed is:

1. In a cage assembly, a main support having spaced end supports, means holding the end supports in upright, spaced relation, corresponding ledges on the spaced supports, and a panel frame having complementary ledge elements engageable over the first-named ledges so that the panel frame may be removably mounted on the support; the panel frame including end parts and a panel having substantially vertical faces, the end parts being secured to the opposite ends of the panel and supporting the aforementioned ledge elements, and a plurality of individual cages supported on the panel frame.

2. The assembly of claim 1, wherein the individual cages have individually separable hanger means for their support on the panel.

3. The assembly of claim 1, wherein the end parts having the aforesaid ledge elements, have supporting edges engageable with a flat surface to support the frame and cages when the panel frame is removed from the support.

4. The assembly of claim 3, wherein the end parts are wide at the top and narrow at the bottom, but are pivoted to the panel, so that when the panel frame is removed from the support, the end parts may be turned around to dispose their wide parts downwardly.

5. The assembly of claim 1, with means to restrain accidental displacement of the panel frame on the support in fore and aft and in lateral directions.

6. In a cage assembly, a support having a plurality of spaced ledges, a panel frame comprising an elongated panel and two end plates, one end plate secured transversely at each end of the panel, the end plates having outwardly extending flanges at their upper edges, by which the panel frame may be suspended on spaced ledges of the support, so as removably to support the panel in vertical position across the support, a plurality of hangers on the panel, a plurality of individual cages removably hooked onto the hangers; the end plates being swiveled onto the panel, for rotation 180° to dispose their flanges downward, to enable the plates to support the panel and cages on a surface apart from the support.

7. The assembly of claim 6, with excreta pans mounted below the cages on the spaced flanges of the support.

8. A cage assembly, comprising a main supporting frame having spaced end supports and connecting elements holding them in upright, spaced relation; the supports having a plurality of oppositely arranged ledges; a plurality of panels each being adapted to span the space between the end supports, and each having at its ends means to engage over and be supported by a pair of the oppositely arranged ledges, the panels being thus insertable onto and removable from the frame; the panels having substantially vertical outwardly facing surfaces; a plurality of open-ended cages, interengageable, separable, hooking means between the cages and the panels for removably securing the cages to the panels in position wherein the panel closes the open ends of the cages; the means at the ends of the panels to engage over and be supported by the ledges, having also means engageable upon a flat surface to support the panels when the panels are removed from the frame.

9. The cage assembly of claim 8, wherein the cages are of open grill work, and wherein there are trays extending between the end supports and removably mounted upon the ledges, there being a tray beneath the cages on each panel.

10. An animal cage, comprising spaced solid panel side walls; openwork means between the side walls holding them in spaced relation, the open grillwork means providing a bottom, a front and a top for the cage, the back being permanently open to give immediate access to the interior of the cage; the solid panel side walls keeping inmates of the cage away from inmates of other cages disposed adjacent, and the grillwork means providing for ready observation of the inmates, as well as for ventilation and sanitation; support means adjacent the open back of the cage by which the cage may be supported against a panel to enclose the open back, and support means of the same kind adjacent the front of the cage with its open back in a forward position to enable an operator to reach into the cage.

11. The cage of claim 10, wherein the front grillwork means slopes down and forwardly from the top, and wall means providing a food receptacle, projecting upwardly from said sloping front.

12. The cage of claim 10, wherein the support means include pins, one extending outwardly from each side panel adjacent its front and one extending outwardly adjacent its rear, the pins being below the tops of the side walls.

13. The cage of claim 10, together with a panel that is vertical, and the securing means includes interengaging hook means between the cage and the panel to support the cage with its side walls adjacent the open end against the panel, the hook means being of the type to permit separation of the cage by a lifting movement, the hook means being located between top and bottom of the cage walls to cause the cage to be securely held against the panel and to prevent the animal from pushing the cage walls away from the panel.

14. The cage of claim 10, wherein the top slopes forward and downward, and the support means comprises projections on the front that are part of a rod extending from side to side and spaced above the top.

15. In a cage assembly; opposite, spaced, upright end supports; a panel frame comprising a vertical hollow panel and means removably supporting it at its ends on the two end supports and thereby suspending it between them; a plurality of cages; means removably securing the cages on opposite faces of the vertical panel; the panel supporting means including portions operable when the panel is removed from the end supports to engage upon a level surface at a plurality of points and thereby maintain the panel in upright position with stability.

16. In the assembly of claim 15: the cages having sides, bottom, top and front portions and being open at the back, and the securing means for mounting them onto the panel including means to mount them with their open backs against and enclosed by the panel and means to mount them with their open backs facing away from the panel to give access to their interior.

References Cited in the file of this patent

UNITED STATES PATENTS

| | | |
|---|---|---|
| 828,751 | Knudson | Aug. 14, 1906 |
| 1,644,472 | Hatch | Oct. 4, 1927 |
| 2,105,058 | Smith et al. | Jan. 11, 1938 |
| 2,275,914 | Lorenz | Mar. 10, 1942 |